June 8, 1937.  J. KJEKSTAD  2,082,836
WELDED CONSTRUCTION
Filed Sept. 21, 1933
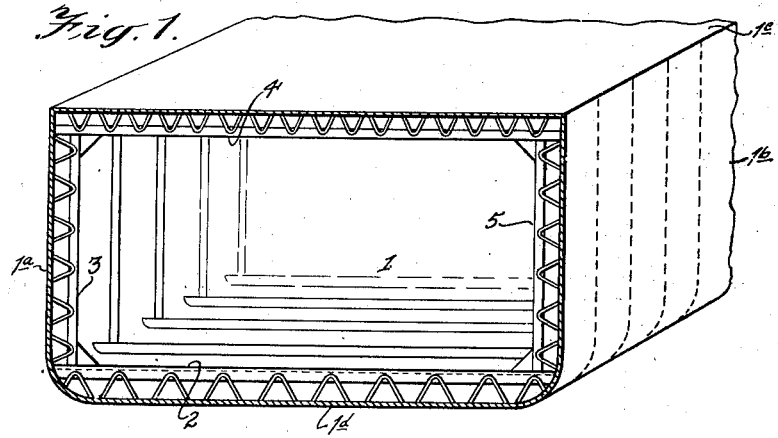
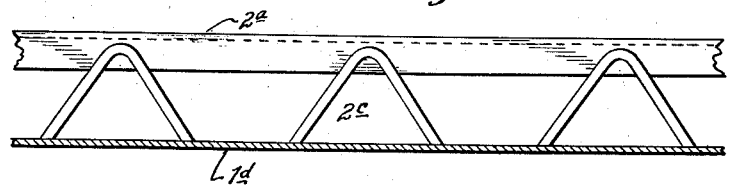 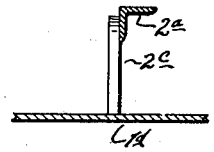
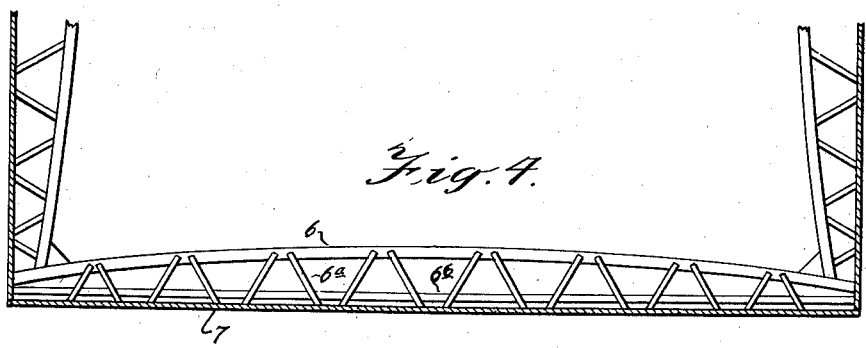
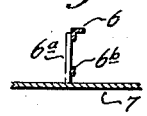
INVENTOR
Johannes Kjekstad
BY
ATTORNEY Patented June 8, 1937

2,082,836

UNITED STATES PATENT OFFICE 2,082,836

WELDED CONSTRUCTION

Johannes Kjekstad, Hillside, N. J.

Application September 21, 1933, Serial No. 690,341

1 Claim. (Cl. 114—79)

The invention herein disclosed relates to the construction of vessels and it is particularly applicable to a welded construction in which walls of steel plating are braced by frame trusses such, as the steel hulls of ships.

In the substitution of riveting with welding for securing steel parts together, difficulty has been encountered in securing bracing to the steel plating making up the walls of a vessel. This difficulty is most pronounced in connections between sections of different thicknesses and shapes, for example, the connection between a standard angle iron used as a stiffener or bracing and the plating forming the wall to be braced by the angle iron. Where two such elements of different thickness are secured by a continuous weld, there is an unequal expansion and contraction from the heat absorbed by the metal in the welding operation. This variation in expansion and contraction between the plating of a vessel and the bracing therefor results in locked-in stresses which may be partially neutralized if the parts along the weld warp freely. If, however, the parts welded together are held rigid and prevented from warping, the locked-in stresses may reach and remain, in magnitude, close to the magnitude of stresses necessary to fracture the weld. Such locked-in stresses render the construction inadequate to absorb additional stresses as the ordinary stresses resulting from the utilization of the structure for the particular purpose for which it is constructed. A common example of this condition is found in the welding of shaped stiffeners, such as angle irons, channel irons, I-beams and flat bars to the plates making up the shell plating and bulkheads of the hulls of vessels. Where such stiffeners are secured to the plating by continuous welds the contraction and expansion along the line of the weld results in either warping the section or, if the plate and the stiffener are heavy enough to withstand the stresses set up by the unequal contraction, the stresses due to the unequal contraction are locked in and result in subsequent fractures when the section is subjected to the stresses incident to its ordinary use.

Attempts have been made to overcome these disadvantages in the use of welding for securing stiffeners to plating. One of the most common attempts to remedy this condition and prevent these locked-in stresses, the magnitude of which can not be determined, is the so called intermittent or staggered welding. In this method, the stiffener is welded to the plating by a series of spaced individual and independent welds. These welds are usually spaced sufficiently far apart to break up the continuity of contraction from the heat absorbed by the welding. While the locked-in stresses are reduced by welding the stiffener to the plating in this manner, the stiffener and plating are not held together between the welds and spaces are formed between the stiffener and the plating. The separated surfaces of the plating and the stiffener forming the sides of the spaces between the welds corrode and the rust formed from this corrosion frequently sets up a pressure sufficient to rupture the connection between the plating and the shaped stiffener.

Another disadvantage of these spaces formed by the separation of the stiffener and the plating between welds is the inability of one to properly clean these spaces. This is especially obnoxious in tankers which carry a liquid cargo such as carriers of fuel oil, for example. In changing from carrying heavy fluid oils, for example, to gasoline, the small amount of oil held in the space formed by the separation of the stiffener and the plating between welds is sufficient to discolor the gasoline.

By the invention herein disclosed, the necessity and desirability of continuous welds between plating and the bracing therefor is eliminated. Likewise, there is not the disadvantage of the inaccessible space formed by the separation of the bracing and plating between successive spaced welds formed by the intermittent or staggered welding. In accordance with the invention, the bracing for the plating is a built-up truss which includes the plating as one chord thereof and which may include standard shapes as the other chord thereof. A series of elements extend between the two chords of the truss and contact with and are secured to the chords at spaced intervals. This construction is not affected by differences in expansion and contraction; and it does not have cavities incident in the use of shaped stiffeners intermittently welded to the plate.

An advantage of the construction of this invention is the fact that it is possible, practical and economical to fabricate shell and bulkhead plating stiffeners which are technically correct for the work they are to perform and thus decrease the total hull weight which results in greater pay load carrying capacity for a given draft, or decreased draft for a given load carrying capacity. In using standard shapes for stiffeners in welded ship construction, the material of the standard shapes can not be used to its highest degree of weight efficiency because the neutral axis in a section formed by welding a shaped stiffener to the plating of the shell or a bulkhead, is unbalanced resulting in a greater load carrying capacity in one direction than in the opposite direction, and furthermore a standard shaped section has a uniform cross section in its entire length and forms a uniform cross section with the plating in its entire length. The highest load carrying capacity per weight unit of the standard section is not utilized because the section modulus of the standard section is constant and the same at the point half-way between the supports where the load is at a maximum as towards the point of support where the load decreases towards zero.

Another disadvantage of the shaped stiffeners which is eliminated by the construction of this invention is the fact that the shaped fasteners form with the shell of a vessel a series of compartments which are divided by the shaped fasteners and although some shapes are provided with holes for draining each of these panels or compartments, these drain holes are not thoroughly effective and each compartment must be separately cleaned in changing cargoes, particularly in tankers carrying heavy and light oils.

In one form, this invention is embodied in a hull of a vessel in which the shell plating is braced by a built-up truss. The built-up truss includes a standard shaped angle iron as one chord and the shell plating as the other chord thereof. Between these two chords, which may approach each other at the two ends in accordance with the decrease in load from the center towards the ends, a series of transversals extend and are secured to the chords. The several transversals are welded to the chords at spaced intervals and form with the chords the built-up truss for bracing the plating. The transversals may of course be integral with the chord opposite to the plating or they may be separate and distinct from the chord and secured thereto by welding.

Such a construction is illustrated in the accompanying drawing and described in detail below from which illustration and description a clearer understanding of the invention may be had.

In the drawing:

Fig. 1 is a perspective of a part of a hull of a barge;

Fig. 2 is an enlarged fragmentary sectional elevation of the same;

Fig. 3 is a transverse section of the truss shown in Fig. 2 and it is taken along the line 3—3 of Fig. 2;

Fig. 4 is an enlarged transverse sectional elevation of a modified construction; and Fig. 5 is a cross section of this modified construction taken along the line 5—5 of Fig. 4.

The vessel shown in the drawing is the hull 1 of a barge suitable for carrying a liquid cargo. The shell plating of this barge is shown as being braced by a series of built-up frames extending transversely of the barge and placed at spaced intervals longitudinally thereof. Each of the frames includes a frame truss for each of the sides 1a and 1b, the deck 1c and the bottom 1d of the shell. These four trusses are secured together and form the frame. All of the frames are similar to the frame shown at the edge of the section of the hull illustrated in Fig. 1. This frame is made up of the four trusses 2, 3, 4 and 5. The trusses 3, 4 and 5 are identical with the truss 2 which braces the bottom 1d of the shell plate.

The truss 2 consists of two chords, an angle iron 2a, the bottom plating 1d and a series of transversals 2c extending between the two chords. The transversals are made up of bent bars, substantially V-shaped. The apexes of these bent bars are secured to one flange of the angle iron, and the ends of the legs of the bars are secured to the plating. The bars are secured to the angle iron and to the plating by welding and with the plating and the angle iron as chords form built-up trusses which brace the plating.

It will be observed that elements of the built-up truss may be welded to the plating without the locked-in stresses incident to the continuous welding of the shaped stiffeners to the plating. Also the construction is free from the inaccessible spaces formed by the separation of the bracing and the plating between successive welds in the intermittent welding of shaped stiffeners to the plating.

The shape of the truss may vary in accordance with the load and also in construction. An example of one variation is shown in Figs. 4 and 5. In this construction, the chord formed by the angle iron 6 approaches the plating 7 so that the section modulus of the built-up truss varies in accordance with the load, thus utilizing the highest values of the steel utilized in the built-up truss. In the example shown, the truss is made up of the angle iron 6 and the bottom plating 7 as chords thereof. The angle iron 6 is bent so that it is spaced from the plating a greater distance at its longitudinal center than at its ends. Between the angle iron and the bottom plating there is a series of transverse elements 6a which are secured to one flange of the angle iron and to the bottom plating by being welded thereto. An additional element 6b may be used which extends along the truss and braces these transverse elements between their ends.

In a built-up truss such as this, the truss may be so constructed as to utilize the highest values of the material making up the truss. Thus, the greatest carrying capacity for a given draft can be secured in the hull of a vessel.

It will be appreciated that in the construction of hulls, these built-up frame trusses may be run longitudinally of the hull as well as transversely and they may be used for bracing bulkheads and other such elements requiring support.

It will be obvious that there are many different types of built-up trusses that will embody this invention and that various changes may be made by those skilled in the art in the details of the construction described above within the principle and scope of the appended claim.

I claim:

In a vessel, the combination comprising a wall consisting of steel plating and a brace for the wall including a member having a flange extending parallel to the plane of the plating and spaced from the plating and a series of integral spaced transversals extending from one edge of the flange and between the flange and the plating, the ends of the transversals being welded to the plating.

JOHANNES KJEKSTAD.